Figures 3, 4, 4A:
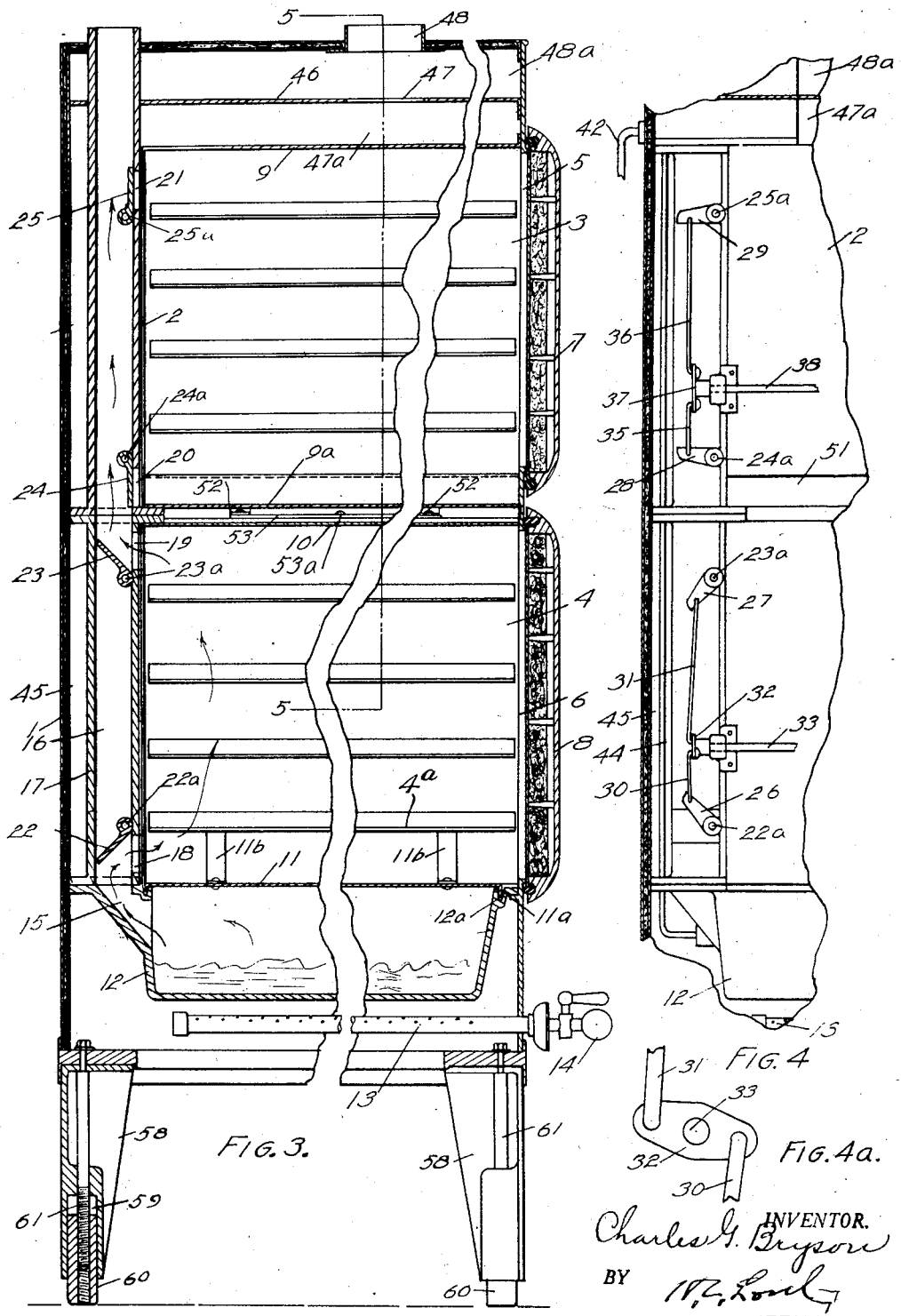

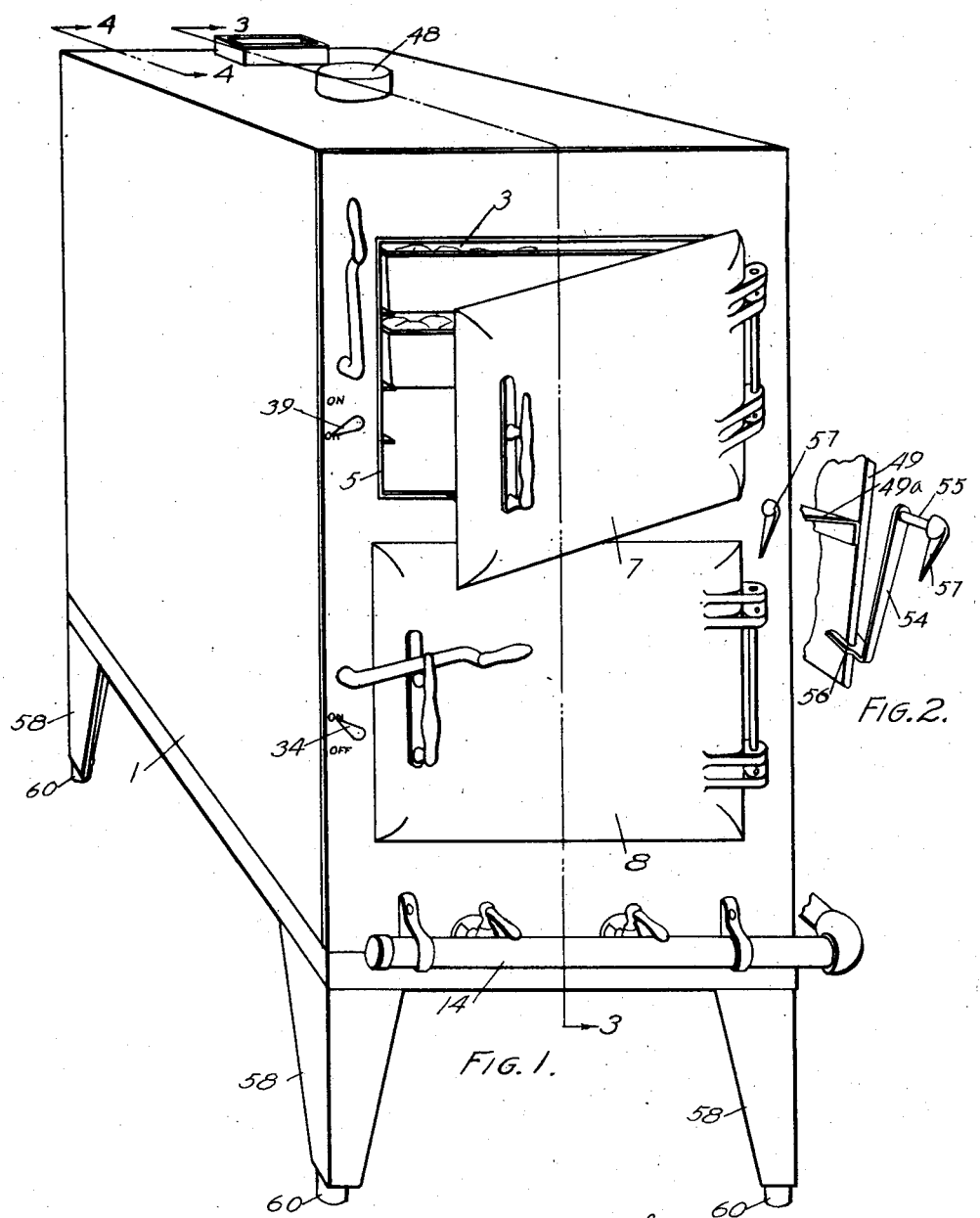

July 14, 1931. C. G. BRYSON 1,814,122
COOKER
Filed Feb. 5, 1929 3 Sheets-Sheet 2

INVENTOR.
Charles G. Bryson
BY
ATTORNEYS.

July 14, 1931. C. G. BRYSON 1,814,122
COOKER
Filed Feb. 5, 1929 3 Sheets-Sheet 3
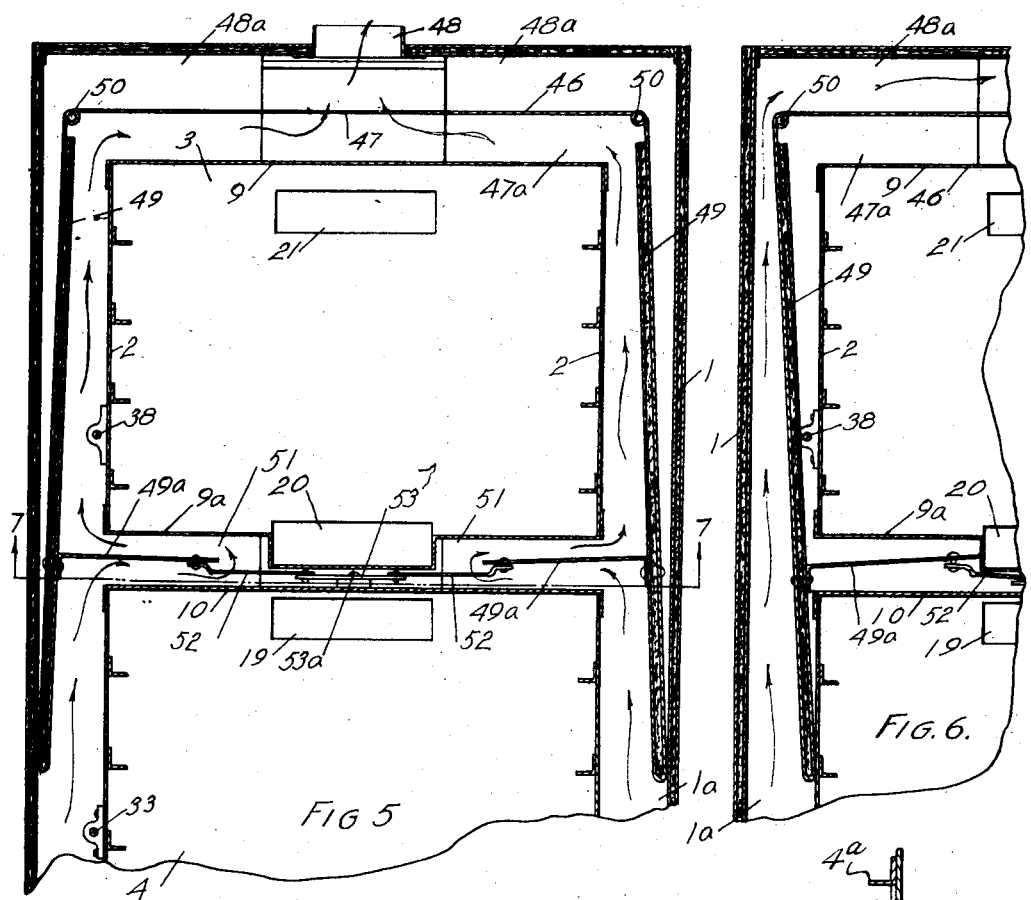
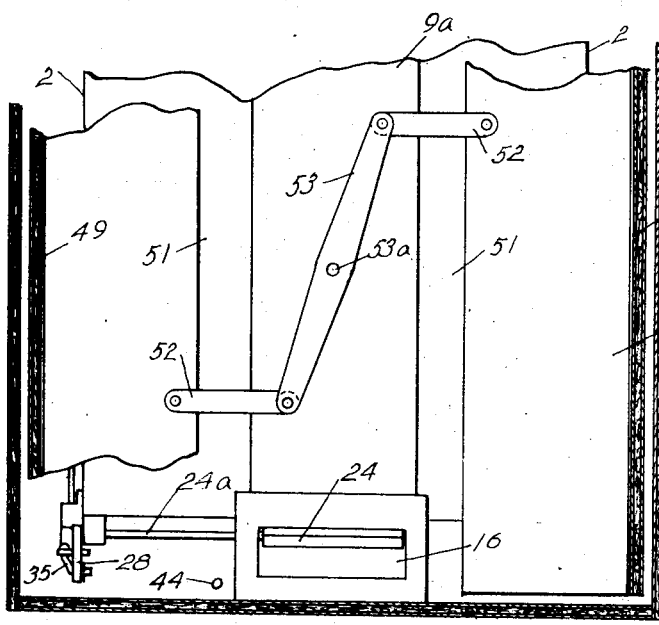
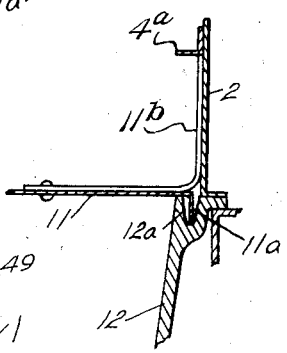
Charles G. Bryson
INVENTOR.
BY
ATTORNEYS.

Patented July 14, 1931

1,814,122

UNITED STATES PATENT OFFICE

CHARLES G. BRYSON, OF ERIE, PENNSYLVANIA, ASSIGNOR TO ERIE RESTAURANT EQUIPMENT COMPANY, OF ERIE, PENNSYLVANIA, A CORPORATION OF PENNSYLVANIA

COOKER

Application filed February 5, 1929. Serial No. 337,683.

This invention is designed to improve cookers. Cookers have heretofore been formed in which there is a cooking chamber which cooking chamber is supplied with steam. Such cooking chambers have given difficulty in the past in that the upper parts of such chambers, where the steam is generated directly at the chamber, are usually warmer than the lower parts of the chambers due to the escaping gases from the burners generating the steam. The present invention obviates this difficulty. In addition the invention involves the division of the cooking chamber into compartments into which steam may be turned and means for controlling the inflows of steam to such compartments and the controlling of the hot gases so that one of the compartments may be utilized as a dry oven, or as a steaming oven as desired. Features and details of the invention will appear from the specification and claims.

A preferred embodiment of the invention is illustrated in the accompanying drawings as follows:—

Fig. 1 shows a perspective view of the cooker.

Fig. 2 a detailed perspective view of the control mechanism for the hot gases.

Fig. 3 a sectional view on the line 3—3 in Fig. 1.

Fig. 4 a sectional view on the line 4—4 in Fig. 1.

Fig. 4a a detailed view of a portion of the steam valve control.

Fig. 5 a section on the line 5—5 in Fig. 3.

Fig. 6 a similar section showing a different relation of the baffles.

Fig. 7 a section on the line 7—7 in Fig. 5.

Fig. 8 a detailed sectional view of the cover of the steam pan.

1 marks the cooker case, usually formed of sheet metal. Within the case there is a wall 2 across the back and sides dividing out the cooker chambers 3 and 4. These chambers have openings 5 and 6 through the front of the case which are controlled by doors 7 and 8. The upper chamber has a top plate 9 closing the chamber to the discharge space of the case. It has a bottom plate 9a. The lower chamber has an upper plate 10 spaced below the plate 9a and a bottom plate 11.

A steam pan 12 is arranged below the lower case and is subjected to the heat or gas burners 13 supplied by a supply pipe 14. The steam pan has a discharge opening 15 at the rear and this opens into an upright passage 16 at the rear of the chambers 3 and 4. This passage 16 extends nearly across the entire rear, the passage being enclosed by walls 17. An opening 18 leads into the bottom of the bottom chamber from the passage 16 and an opening 19 leads from the upper part of the bottom chamber to the passage. An opening 20 leads from the passage 16 to the lower part of the chamber 3 and a passage 21 leads from the upper part of the chamber 3 to the passage 16. Closure valves 22, 23, 24 and 25 control the openings 18, 19, 20 and 21 respectively. These valves are fixed on rods 22a, 23a, 24a, and 25a respectively. Arms 26 and 27 are fixed on the rods 22a and 23a respectively and the arms 26 and 27 are connected by links 30 and 31 with the rock arm 32 at opposite sides of its axis. The rock arm is mounted on a rod 33 which extends outwardly to without the case 1 and is supplied at its outer end by an operating arm 34. It will readily be seen that as the arm 34 is swung the valves 22 and 23 are simultaneously opened and closed through the intermediate mechanism just described so that steam may be admitted and discharged from the chamber 4, or steam may be cut off from this chamber. This is particularly desirable at a time when it is desired to open the door 8 independently of the door 7.

In like manner arms 28 and 29 are secured to the rods 24a and 25a respectively. Links 35 and 36 connect these arms with a two-way rock arm 37 similar to the rock arm 32. The rock arm 37 is fixed on a rod 38 extending to the front of the axis where an operating arm 39 is provided. By operating this arm the valves 24 and 25 are opened and closed simultaneously admitting or excluding the steam from the chamber 3.

The upper end of the passage 16 leads through the top of the case. A plate 46 is arranged in the top of the cooker between the top plate 9 of the upper chamber and the top of the case dividing this space into two passages. An opening 47 leads through the plate 46 and is directly under a gas discharge pipe 48 from the case. Baffle plates 49 are hinged at 50 on the ends of the plates 46. These baffle plates extend downwardly to below the top of the lower chamber. Deflector plates 49a extend from the baffle plates 49 inwardly into a passage 51 arranged between the bottom plate 9a of the upper chamber and the top plate 10 of the lower chamber. With the baffle 49 thrown to the position shown in Fig. 5 the gases from the burner passing up the passages 1a between the case and the chamber walls are deflected by the deflector 49a under the upper chamber and pass up between the baffle 49 and the side walls of the upper chamber to a passage 47a over the upper chamber and discharge through the opening 47. With the baffle 49 swung to its inner position, as shown in Fig. 6, the gases from the burners discharging through the passages 1a are deflected away from the side walls of the chambers and delivered to a passage 48a above the plate 46 and from this are discharged to the discharge pipe 48.

In this way, it will be seen that the hot gases from the burner can be deflected either into contact with the upper chamber, or away from the upper chamber, and when the upper chamber is used as a steam chamber these gases are ordinarily deflected away from it so that the upper chamber has the same temperature as the lower chamber. This gives a very desirable control as ordinarily where the chambers are used for the same materials the same temperature is desired. On the other hand, with this arrangement the steam may be cut off to the upper chamber and the hot gases delivered to it so as to use it as a dry cooking chamber, or oven.

In order that both baffle plates may be operated together I provide a mechanism for throwing these baffles together. Links 52 extend from the plates 49a to a cross rock arm 53 pivotally mounted on a pin 53a on the top plate 10. It will be readily seen that as one baffle is moved the other through this linkage is also moved to throw the gases against the oven side, or away from it. A rock arm 54 is fixed on a rock shaft 55. The rock arm has a fork 56 engaging one of the baffle plates 49. An operating arm 57 is fixed on the shaft 55 outside of the case and through the operation of this arm 57 the baffles may be thrown to properly control the flow of gases.

In order to properly seal the lower chamber from the direct flow of steam from the pan I prefer to provide the upper edge of the pan with a surrounding sealing groove 12a. The bottom plate 11 is provided with a down-turned lip 11a extending into this groove. The bottom plate is locked in position by latch fingers 11b which are pivotally mounted on the bottom plate and adapted to be swung under the brackets 4a at the sides of the lower oven. As steam is produced it condenses in the groove 12a and forms a seal against the direct flow of steam to the lower chamber. At the same time this lower plate 11 is removable so that access may be readily had to the pans.

It is desirable in the proper operation of the device that it be level. To accomplish this purpose I provide an adjustable means. Legs 58 have sockets 59. Feet 60 are arranged in these sockets and are adjusted by screws 61 extending downwardly from the bottom plates 2 of the case.

What I claim as new is:—

1. In a cooker, the combination of a case having a cooking compartment therein; a steam generator having outlets maintaining approximately atmospheric pressure; steam connections leading to and from the compartment, said connections having large capacities adapted to convey steam at approximately atmospheric pressure; and valves controlling the connections.

2. In a cooker, the combination of a case having a cooking compartment therein having outlets maintaining approximately atmospheric pressure; a steam generator; means for supplying heat for the generator and dry heat for the compartment; a steam connection between the generator and the compartment, said connection being of a capacity to convey steam at atmospheric pressure; a valve controlling the connection; and means controlling the application of the dry heat directing it into and out of heating relation with the compartment.

3. In a cooker, the combination of a case having a cooking compartment therein; a steam generator; means for supplying heat for the generator and dry heat to the compartment; a steam connection between the generator and the compartment; a valve controlling the connection; and means controlling the application of the dry heat directing it into and out of heating relation with the compartment.

4. In a cooker, the combination of a case having a cooking compartment therein; a steam generator; means for supplying heat for the generator and dry heat for the compartment; a steam connection between the generator and the compartment; a valve controlling the connection; and means controlling the application of the dry heat directing it into and out of heating relation with the horizontal and vertical walls of the compartment.

5. In a cooker, the combination of a case having a cooking compartment therein having outlets maintaining approximately atmospheric pressure; a door extending from the front into the compartment; a steam generator; a steam connection at the rear of the compartment leading from the generator to the compartment, said connection having a capacity to deliver steam at approximately atmospheric pressure; means for supplying heat for the generator and dry heat for the compartment; and flues from the means at the sides of the compartment directing the heat into and out of heating relation with the compartment.

6. In a cooker, the combination of a case having two cooking compartments, one above the other; a steam generator; connections between the steam generator and each of the compartments; valves controlling said connections; means for supplying dry heat for the case and heat for the generator; and means directing the dry heat into and out of heating relation with one of the compartments.

7. In a cooker, the combination of a case having two cooking compartments, one above the other; a steam generator; connections between the steam generator and each of the compartments; valves controlling said connections; means for supplying dry heat for the case and heat for the generator; and means directing dry heat into and out of heating relation with the top compartment.

8. In a cooker, the combination of a case having two cooking compartments, one above the other therein; a steam generator; connections between the steam generator and each of the compartments; means for supplying dry heat to the case and heat for the generator; and devices controlling said means with relation to one compartment to apply both steam and dry heat to said compartment simultaneously, dry heat alone to said compartment, or steam alone to said compartment.

9. In a cooker, the combination of a case having two cooking compartments, one above the other therein; a steam generator; connections between the steam generator and each of the compartments; means for supplying dry heat to the case and heat for the generator; and devices controlling said means with relation to the upper compartment to apply both steam and dry heat to said compartment simultaneously, dry heat alone to said compartment, or steam alone to said compartment.

10. In a cooker, the combination of a case having a plurality of cooking compartments, one above the other; a steam generator; a connection between the steam generator and the lower compartment, said connection having a capacity for delivering steam at atmospheric pressure and said compartment having an outlet permitting a direct flow of steam through the compartment; means for supplying dry heat to the case and heat for the generator; and means directing dry heat from the means into and out of heating relation with the upper compartment.

11. In a cooker, the combination of a case having two cooking compartments, one above the other; a steam generator; connections between the steam generator and each of the compartments, said connections having a capacity for delivering steam at atmospheric pressure and said compartments having outflows maintaining approximately atmospheric pressure and permitting a flow of steam through the compartments; means for supplying dry heat to the case and heat for the generator; and means directing dry heat from the means into and out of heating relation with the upper compartment.

12. In a cooker, the combination of a case having two cooking compartments, one above the other; a steam generator; connections between the steam generator and each of the compartments, said connections having a capacity for delivering steam at atmospheric pressure and said compartments having outflows maintaining approximately atmospheric pressure and permitting a flow of steam through the compartments; valves controlling said connections; means for supplying dry heat for the case and heat for the generator; and means directing the dry heat into and out of heating relation with one of the compartments.

13. In a cooker, the combination of a case having a plurality of cooking compartments, one above the other; a steam generator; a connection between the steam generator and the lower compartment; a steam connection between the lower compartment and the upper compartment; means supplying dry heat to the case and heat to the steam generator; and means directing dry heat into and out of heating relation with one of the compartments.

14. In a cooker, the combination of a case having a plurality of cooking compartments, one above the other; a steam generator; a connection between the steam generator and the lower compartment; a steam connection between the lower compartment and the upper compartment; means supplying dry heat to the case and heat to the steam generator; and means directing dry heat into and out of heating relation with the upper compartment.

15. In a cooker, the combination of a case having a plurality of cooking compartments, one above the other; a steam generator; a connection between the steam generator and the lower compartment; a steam connection between the lower compartment and the upper compartment, said connections having a capacity for delivering steam at atmospheric pressure, and said compartments having an atmospheric discharge connection permitting a through flow of steam; means supplying dry heat to the case and heat to the steam generator; and means directing dry heat into and out of heating relation with one of the compartments.

16. In a cooker, the combination of a case having a plurality of cooking compartments, one above the other; a steam generator, the lower wall of the upper case forming the upper wall of the steam generator; steam connections from the generator to the compartments; means controlling said connections; means supplying dry heat to the case and heat to the generator, the generator insulating the lower compartment from the direct action of said means; and means controlling the application of dry heat to and from the upper compartment.

In testimony whereof I have hereunto set my hand.

CHARLES G. BRYSON.